United States Patent
Busch et al.

(10) Patent No.: US 10,232,880 B2
(45) Date of Patent: Mar. 19, 2019

(54) LANE-KEEPING ASSISTANT

(71) Applicant: VOLKSWAGEN AKTIENGESELLSCHAFT, Wolfsburg (DE)

(72) Inventors: Sebastian Busch, Braunschweig (DE); Michael Wonke, Braunschweig (DE); Thomas Eigel, Berlin (DE)

(73) Assignee: Volkswagen Aktiengesellschaft (DE)

( * ) Notice: Subject to any disclaimer, the term of this patent is extended or adjusted under 35 U.S.C. 154(b) by 190 days.

(21) Appl. No.: 15/507,769

(22) PCT Filed: Aug. 14, 2015

(86) PCT No.: PCT/EP2015/068721
§ 371 (c)(1),
(2) Date: Mar. 1, 2017

(87) PCT Pub. No.: WO2016/034389
PCT Pub. Date: Mar. 10, 2016

(65) Prior Publication Data
US 2017/0297623 A1 Oct. 19, 2017

(30) Foreign Application Priority Data
Sep. 4, 2014 (DE) .................. 10 2014 217 694

(51) Int. Cl.
*G01C 21/00* (2006.01)
*B62D 15/02* (2006.01)
*G08G 1/16* (2006.01)

(52) U.S. Cl.
CPC ....... *B62D 15/0265* (2013.01); *B62D 15/025* (2013.01); *G08G 1/166* (2013.01); *G08G 1/167* (2013.01)

(58) Field of Classification Search
CPC .. B62D 15/0265; B62D 15/025; G08G 1/167; G08G 1/166
See application file for complete search history.

(56) References Cited

U.S. PATENT DOCUMENTS

2005/0231389 A1* 10/2005 Willemin ............ B60R 1/002
340/942
2006/0111842 A1 5/2006 Sugimoto et al.
(Continued)

FOREIGN PATENT DOCUMENTS

DE 102004027085 A1 12/2005
DE 102006039682 A1 2/2008
(Continued)

OTHER PUBLICATIONS

Search Report for International Patent Application No. PCT/EP2015/068721; dated Jan. 28, 2016.
(Continued)

*Primary Examiner* — Ian Jen
(74) *Attorney, Agent, or Firm* — Barnes & Thornburg LLP

(57) ABSTRACT

A method and a device for controlling the lane-keeping of a motor vehicle, wherein the motor vehicle has a lane-keeping assistant with at least the states inactive and active, which lane-keeping assistant is used to keep the vehicle in the driver's own lane. The method includes checking whether the vehicle has drifted into the opposite lane; checking whether there is opposing traffic in the opposite lane; activating the lane-keeping assistant if the vehicle has drifted and there is opposing traffic; controlling the lane-keeping assistant with respect to the oncoming object by active steering intervention, wherein the oncoming vehicle is interpreted as a lane boundary of the driver's own lane.

7 Claims, 1 Drawing Sheet

(56) References Cited

U.S. PATENT DOCUMENTS

| | | | |
|---|---|---|---|
| 2008/0201038 A1* | 8/2008 | Jung | B60T 8/172 |
| | | | 701/41 |
| 2013/0238192 A1 | 9/2013 | Breu | |
| 2013/0321172 A1 | 12/2013 | Igarashi et al. | |
| 2016/0078760 A1* | 3/2016 | Crickmore | G08G 1/04 |
| | | | 701/117 |
| 2017/0297623 A1* | 10/2017 | Busch | B62D 15/025 |
| 2018/0127023 A1* | 5/2018 | Fuzes | B62D 5/0403 |

FOREIGN PATENT DOCUMENTS

| | | |
|---|---|---|
| DE | 102008038816 A1 | 2/2010 |
| DE | 102009007254 A1 | 8/2010 |
| DE | 102009041187 A1 | 2/2011 |
| DE | 102010009133 A1 | 8/2011 |
| DE | 102010063792 A1 | 6/2012 |
| DE | 102012004791 A1 | 9/2013 |
| DE | 102012208712 A1 | 11/2013 |
| EP | 1927499 A1 | 6/2008 |
| JP | 2000062554 A | 2/2000 |
| JP | 2006298294 A | 11/2006 |

OTHER PUBLICATIONS

Office Action for German Patent Application No. 10 2014 217 694.8; dated Jul. 1, 2015.

\* cited by examiner

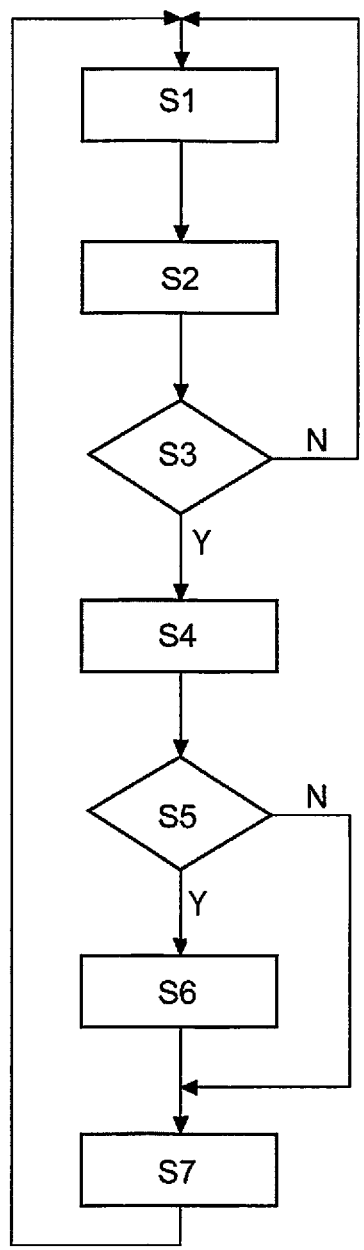

LANE-KEEPING ASSISTANT

PRIORITY CLAIM

This patent application is a U.S. National Phase of International Patent Application No. PCT/EP2015/068721, filed 14 Aug. 2015, which claims priority to German Patent Application No. 10 2014 217 694.8, filed 4 Sep. 2014, the disclosures of which are incorporated herein by reference in their entirety.

SUMMARY

Illustrative embodiments relate to a method for controlling the lane keeping of a motor vehicle and to a corresponding lane keeping assistant.

BRIEF DESCRIPTION OF THE DRAWINGS

A disclosed embodiment is explained below with reference to the single drawing, in which:

FIG. 1 shows a flowchart of the disclosed method.

DETAILED DESCRIPTION OF THE DISCLOSED EMBODIMENTS

To assist the driver and to increase road safety, motor vehicles today are usually equipped with various assistance systems. One of these assistance systems is the lane keeping assistance system, which assists the driver of the vehicle in keeping the vehicle in the lane. Prerequisites for assistance in this case are that the driver is in contact with the steering wheel, the direction-of-travel indicator is not active and the steering movement performed by the driver does not point to a change of lane.

The lane keeping assistant is used in various configurations, wherein, in its simplest form, the lane keeping assistant outputs a warning to the driver when the vehicle approaches a lane marking for a lane if a change of lane is not identifiable. On winding journeys in mountainous surroundings, the system can then irritate the driver with continual warnings, since often driving on a winding road requires changing to the adjacent lane without the driver using a turn signal.

In a more complex configuration, the lane keeping assistant can, when the vehicle approaches the lane marking for a lane, impose a steering torque on the steering that takes the vehicle back into the lane again. The steering torque applied must be overridable by the driver in this case, snice the driver may intend to change lane, for example, without having used the direction-of-travel indicator.

Further, the lane keeping assistant may be coupled to observation of the driver activity. As such, the document DE 10 2008 038 816 A1 describes a system in which the lane keeping assistant is automatically activated if the driver is inattentive and a driving situation is identified in which there is the threat of the lane being left while there is dangerous oncoming traffic. However, a collision threat can be avoided in this case only if a lane marking is present and identifiable.

Similarly, the document DE 10 2009 041 187 A1 describes a lane keeping assistant that detects the line of vision of the driver. If the line-of-vision detection identifies that the driver consciously wishes to cross the lane marking, then there is no intervention in the steering action of the driver. It is thus possible for the lane keeping function of the lane keeping assistant to be activated, or not to be activated, as a function of the driver's line of vision.

Nevertheless, the assistance function of the lane keeping assistant is often switched off by the driver, since its interventions are often perceived as annoying.

The document DE 10 2010 063 792 A1 relates to a method for automatically and dynamically selecting driver assistance functions of an assistance system, each driver assistance function being able to assume an activated or deactivated state. The driving situation of the vehicle is determined by means of suitable ambient sensors and the driver assistance functions are selected as a function of the ascertained driving situation of the vehicle, independently of the driver. If no lane marking is identified when the vehicle driving situation is ascertained, then the lane keeping assistance function is deactivated, which can sometimes lead to a critical situation when there is oncoming traffic in a roadworks situation.

Disclosed embodiments allow for configuring the lane keeping assistance function such that driver acceptance is increased.

The disclosed method for controlling the lane keeping of a motor vehicle, wherein the motor vehicle has a lane keeping assistant having at least the states inactive and active that is used for keeping the vehicle in its own lane, has the following operations:
  checking whether the vehicle is drifting off onto the opposite carriageway,
  checking whether there is oncoming traffic on the opposite carriageway,
  activating the lane keeping assistant if the vehicle is drifting off and there is oncoming traffic,
  controlling the lane keeping assistant with respect to the oncoming object by activating steering intervention, the oncoming vehicle being interpreted as a lane boundary for the ego vehicle lane.

Optionally, the lane keeping assistant is inactive at the beginning of the method. In this case, inactive means that the lane keeping assistant runs along in the background, as it were, but does not perform interventions in the vehicle guidance or output warnings.

As a further option, the lane keeping assistant looks for lane markings in the surroundings of the vehicle. If lane markings are present, then it is allowed for the lane markings found to be crossed by the lane keeping assistant. This means that it is possible for the collision to be prevented even if the ego vehicle is already partially on the opposite carriageway.

As a further option, the activity of the driver is monitored and the lane keeping assistant is activated only if the driver activity monitoring finds an inattentive driver.

The disclosed lane keeping assistant for keeping a motor vehicle in its own lane that is set up and designed for performing the method explained above, wherein the lane keeping assistant has at least the states active and inactive, the active state allows a steering intervention and the inactive state does not allow steering interventions, comprises
  a device for monitoring the environment of the motor vehicle,
  a device for evaluating the data ascertained by the environment monitoring, and
  a device for performing the lane keeping function by means of at least interventions in the steering, and
  a device for determining oncoming vehicles on the opposite carriageway.

Optionally, the lane keeping assistant has a device for determining a boundary for the ego vehicle lane on the basis of the oncoming vehicle.

As a further option, the lane keeping assistant has a device for determining the driver activity.

Should the driver therefore be inattentive and drift off onto the opposite carriageway, this may be harmless because there is currently no oncoming traffic coming. However, it may be very dangerous if an oncoming vehicle comes close to the ego vehicle on the opposite carriageway and the vehicle drifts off onto the opposite carriageway. In the first case, the lane keeping assistant remains inactive. In the second case, the lane keeping assistant is activated and control with respect to the oncoming object is effected by allowing the lane marking to be crossed and steering only "sufficiently" for a collision with the oncoming vehicle to be avoided.

The disclosed method provides a lane keeping system providing control even in the case in which there are no lane markings. Secondly, intervention in the responsibility of the vehicle driver as a driver is not performed to a greater extent than is necessary to avoid a collision.

FIG. 1 shows an example of the method in chart form. The starting point for the method is the first operation at S1, in which the state of the lane keeping assistant is inactive. In this case, the "inactive" state can be present more or less as a preset or the lane keeping assistant is taken out of the deactivated state or the active state into the inactive state.

To clarify terms, a distinction is drawn between the "deactivated" state, in which the lane keeping assistant is completely switched off and interventions in the driving are not possible, the "inactive" state, in which the lane keeping assistant runs along in the background without intervention in the driving, and the "active" state, in which the lane keeping assistant is active and can perform interventions in the driving.

In the second operation at S2, suitable ambient sensors of the lane keeping assistant are used to examine whether the vehicle remains in its own lane or whether the vehicle can be found to be drifting off in the direction of the opposite carriageway. This may be coupled to monitoring of the attentiveness of the driver.

If it is found in operation at S2 that the vehicle drifts off onto the opposite carriageway, the drifting of the vehicle onto the opposite carriageway being able to be combined with the feature of the inattentive driver within the context of a logic AND function, then the ambient sensors of the lane keeping assistant, i.e., of the vehicle, are used in operation at S3 to examine whether there is currently oncoming traffic on the opposite carriageway or in the adjacent lane and a vehicle is approaching, which means that there could be a collision.

If no oncoming traffic is coming and if the traffic situation is consequently relaxed, i.e., harmless at the moment, then the method returns to operation at S1 in the "N" branch. In other words, the lane keeping assistant is not activated to the "active" state and there is no intervention in the sovereignty of the driver.

If oncoming traffic is identified on the opposite carriageway in operation at S3 and if the traffic situation is consequently dangerous, then the method takes the "Y" branch and passes to operation at S4, in which the lane keeping function of the lane keeping assistant is activated. In other words, the lane keeping assistant is taken into the "active" state.

In subsequent operation at S5, the ambient sensors are used to examine whether the roadway has a lane marking with respect to which the lane keeping assistant usually effects control. If there is a lane marking, i.e., if one is identifiable, then the method takes the "Y" branch and passes to operation at S6, in which crossing of the lane marking is permitted. In other words, the standard control of the lane keeping assistant with respect to the lane marking is suspended and the lane keeping assistant can cross the lane marking. Subsequently, the method passes to operation at S7.

If it is found in operation at S5 that no lane marking is identified and this leads to the conclusion that there is no lane marking present, then the method takes the "N" branch and passes to operation at S7.

In operation at S7, the lane keeping assistant controls the vehicle by means of a steering intervention so that a collision with the oncoming vehicle is avoided. The oncoming vehicle is interpreted as a lane boundary for control instead of a lane marking, and steering is effected "only" sufficiently for a collision to be avoided. After a collision with the oncoming vehicle has been averted by means of the activation of the lane keeping assistant and the use of the oncoming vehicle as a lane boundary, the method returns to operation at S1 again and the lane keeping assistant is taken back into the inactive state, so that fresh control with respect to an oncoming vehicle is possible in the event of drifting off from the lane.

LIST OF REFERENCE SYMBOLS

S1 Inactive state
S2 Check drift and, if need be, driver activity
S3 Check oncoming traffic
S4 Activate lane keeping assistant
S5 Check lane marking
S6 Switch off lane marking control
S7 Lane keeping assistant intervention

The invention claimed is:

1. A method for controlling lane keeping of a motor vehicle, wherein the motor vehicle has a lane keeping assistant having at least the states inactive and active used for keeping the vehicle in its own lane, the method comprising:
    checking whether the vehicle is drifting onto the opposite carriageway;
    checking whether there is oncoming traffic on the opposite carriageway;
    activating the lane keeping assistant if the vehicle is drifting onto the opposite carriageway and there is oncoming traffic; and
    controlling the lane keeping assistant with respect to oncoming object by activating steering intervention, the oncoming vehicle being interpreted as a lane boundary for the vehicle's own lane.

2. The method of claim 1, wherein the lane keeping assistant is inactive at the beginning of the method.

3. The method of claim 1, wherein the lane keeping assistant looks for lane markings in the surroundings of the vehicle and, if lane markings are present, then it is allowable for the lane markings found to be crossed by the lane keeping assistant.

4. The method of claim 1, wherein the activity of the driver is monitored and the lane keeping assistant is activated only if the driver activity monitoring finds an inattentive driver.

5. A lane keeping assistant for keeping a motor vehicle in its own lane, the lane keeping assistant comprising:
    a device for monitoring the environment of the motor vehicle;
    a device for evaluating the data ascertained by the environment monitoring; and a device for performing the lane keeping function by at least interventions in the steering, wherein the lane keeping assistant has at least the states active and inactive, wherein the active state allows a steering intervention and the inactive state does not allow steering interventions, and the lane keeping assistant has a device for determining oncoming vehicles on the opposite carriageway, and wherein the lane keeping function is performed by determining whether the vehicle is drifting onto the opposite carriageway, checking whether there is oncoming traffic on the opposite carriageway, activating the lane keeping assistant if the vehicle is drifting onto the opposite carriageway and there is oncoming traffic; and controlling the lane keeping assistant with respect to oncoming object by activating steering intervention, the oncoming object being interpreted as a lane boundary for the vehicle's own lane.

6. The lane keeping assistant of claim 5, wherein the lane keeping assistant has a device for determining a boundary for the vehicle's own lane based on the oncoming vehicle.

7. The lane keeping assistant of claim 5, wherein the lane keeping assistant has a device for determining the driver activity.

* * * * *